No. 865,810. PATENTED SEPT. 10, 1907.
W. J. TAYLOR.
CLAMP FOR DRAINS, TRAPS, &c.
APPLICATION FILED AUG. 10, 1905. RENEWED FEB. 21, 1907.

Witnesses
P. F. Nagle.
L. Douville.

Inventor.
William J. Taylor.
Wiedersheim & Fairbanks
Attorneys

UNITED STATES PATENT OFFICE.

WILLIAM J. TAYLOR, OF PHILADELPHIA, PENNSYLVANIA.

CLAMP FOR DRAINS, TRAPS, &c.

No. 865,810.  Specification of Letters Patent.  Patented Sept. 10, 1907.

Application filed August 10, 1905, Serial No. 273,527. Renewed February 21, 1907. Serial No. 358,728.

*To all whom it may concern:*

Be it known that I, WILLIAM J. TAYLOR, a citizen of the United States, residing in the city and county of Philadelphia, State of Pennsylvania, have invented a new and useful Clamp for a Drain, Trap, &c., of which the following is a specification.

My invention consists of a clamp for a drain, trap, etc., the same embodying a head, hooks thereon, a screw, freely fitted in said head, and a nut with which said screw engages, provision being made for preventing the rotation of said head and nut during the tightening action of said screw.

Figure 1:
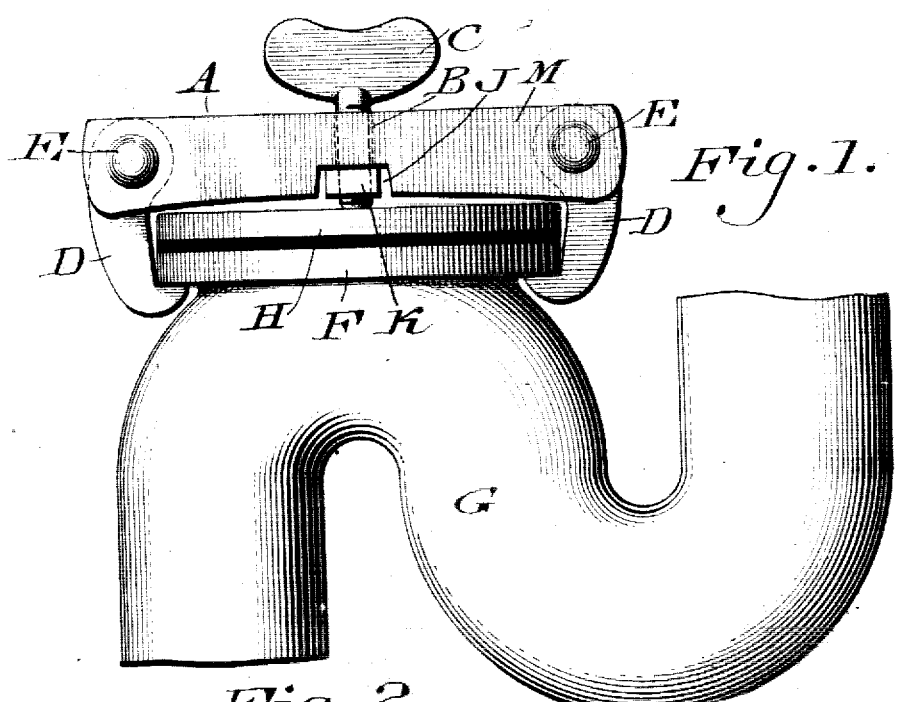
Figure 2:
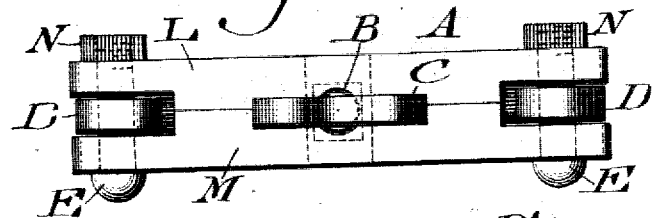
Figure 4:
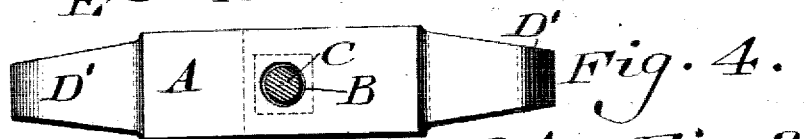
Figure 3:
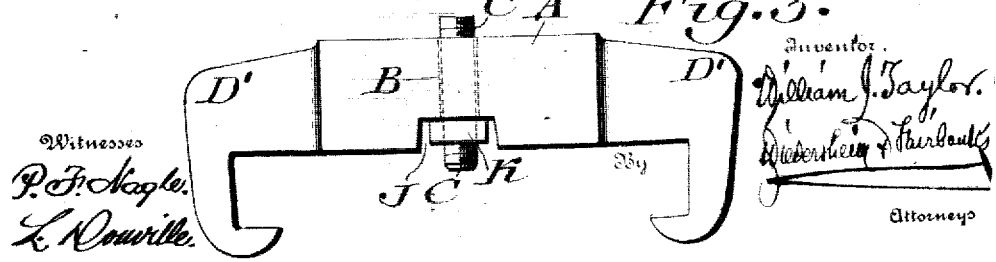

Figure 1 represents a side elevation of a clamp for a drain, trap, etc. embodying my invention. Fig. 2 represents a top or plan view thereof. Fig. 3 represents a side elevation of a modification. Fig. 4 represents a partial top or plan view and partial horizontal section thereof.

Similar letters of reference indicate corresponding parts in the figures.

Referring to the drawings: A designates a head in the center of which is a vertically-arranged unthreaded opening B to receive the shank of the screw C.

On the ends of the head A are the hooks or hooked arms D which depend from said ends and are pivotally-connected therewith by the bolts E whereby said hooks may swing from and towards the shoulder F of the neck of the drain or trap G, it being noticed that the point of the screw is adapted to rest against the cap or cover H of said drain or trap.

On the underside of the head A are inturned shoulders forming a recess or pocket J in communication with said opening B and in which is seated the nut K with the threads of which the shank of the screw C is adapted to engage. This pocket J leaves the portion of the head A above the same reduced in thickness, forming a neck against whose underside, said nut K abuts and causes the bottom of the latter to be flush or comparatively flush with the underside of the head, so that said nut does not project below said head, which otherwise would cause an elongation of the arms D and of the screw C in order that the former may properly reach the shoulder F and the latter may pass entirely through the head A and the nut K to bear against the top of the cap H.

It will be seen that the hook D may be thrown out and the head A is placed over the cap H, the hooks D then closing and engaging under the shoulder F. The screw C is then properly rotated, whereby its point turns on and tightens against the cap H, thus raising the head and powerfully drawing the hooks D against the shoulder F, whereby said cap H is firmly clamped upon the drain or trap and the joint of said cap and the neck of the drain or trap is tightly closed. It is evident that when the screw is rotated in reverse order, the hooks are lowered, whereby they are relieved of their hold on the shoulder F, so that they may be thrown out from the latter and the clamp removed from its position. It will also be seen that the walls of the recess J prevent the nut K from turning and said nut obviates the employment of threads on the walls of the opening B, so that the shank of the screw C is free in said opening and the rotation of said screw will not cause rotation of the head A and shifting of the hooks D from their set position, while the clamp is being tightened.

In Figs. 3 and 4, I show hooks D' as integral with the head, in which case the clamp may be placed in position by sliding it laterally over the cap H, it being evident that the hook D may also be placed in position in the same manner if so desired. As the drain, trap, etc. may be inconvenient of access and it may be difficult to apply the clamp thereto, I divide the head A in the longitudinal direction thereof, forming the sections L, M, as most plainly shown in Fig. 2, it being noticed that the bolts E from which the hooks D are suspended and the nuts N on said bolts serve to unite said sections, each section being a counterpart of the other section or matched as to the half openings to receive the screw C and recesses to receive the head of the hooks D.

Either section may be placed in position over the cap H, the hooks being placed on the bolts E, then the other section may be located by side motion over said cap, its eyes receiving the ends of the bolts, when the nuts are applied and tightened, the head then being comparatively an integral piece. Should either section be fractured or for any other cause, a fresh section required, the nuts N are unscrewed, and the bolts E withdrawn, whereby the sectional head may be dismembered for evident purposes.

Having thus described my invention, what I claim as new and desire to secure by Letters Patent, is:

1. In a clamp of the character stated, a head having in its upper portion at the center thereof, a reduced neck and in its under portion, a pocket which extends from the lower edge of said head to the lower side of said neck and a screw-engaging nut occupying said pocket and adapted to bear against the underside of said neck and be engaged by the side walls of said pocket flush on its underside with the under edge of said head.

2. A clamp of the character stated consisting of a head, engaging arms depending from the ends thereof, said head having shoulders extending inwardly from the underside of the center of said head forming thereat a reduced neck and an inturned pocket, said neck having therein an unthreaded opening which communicates with said pocket, a screw in said opening and a nut on said screw occupying said pocket adapted to bear against the underside of said neck and be embraced by the side walls of said pocket.

3. In a clamp of the character stated, a head, the latter having a pocket therein, depending arms on the ends thereof, bolts passing through said head and arms, a tightening screw, the latter passing freely through said head and a nut engaging said screw and occupying said pocket, said head being formed of longitudinally-divided matched sections, each having its ends adapted to receive said bolts and provided centrally with an unthreaded half opening for said screw and in its underside with a half section of said pocket, said bolts forming common means for coupling said sections as one and axially sustaining said arms.

WILLIAM J. TAYLOR.

Witnesses:
JOHN A. WIEDERSHEIM.
C. D. McVAY.